INVENTOR
JACK GREEN
BY
ATTORNEYS

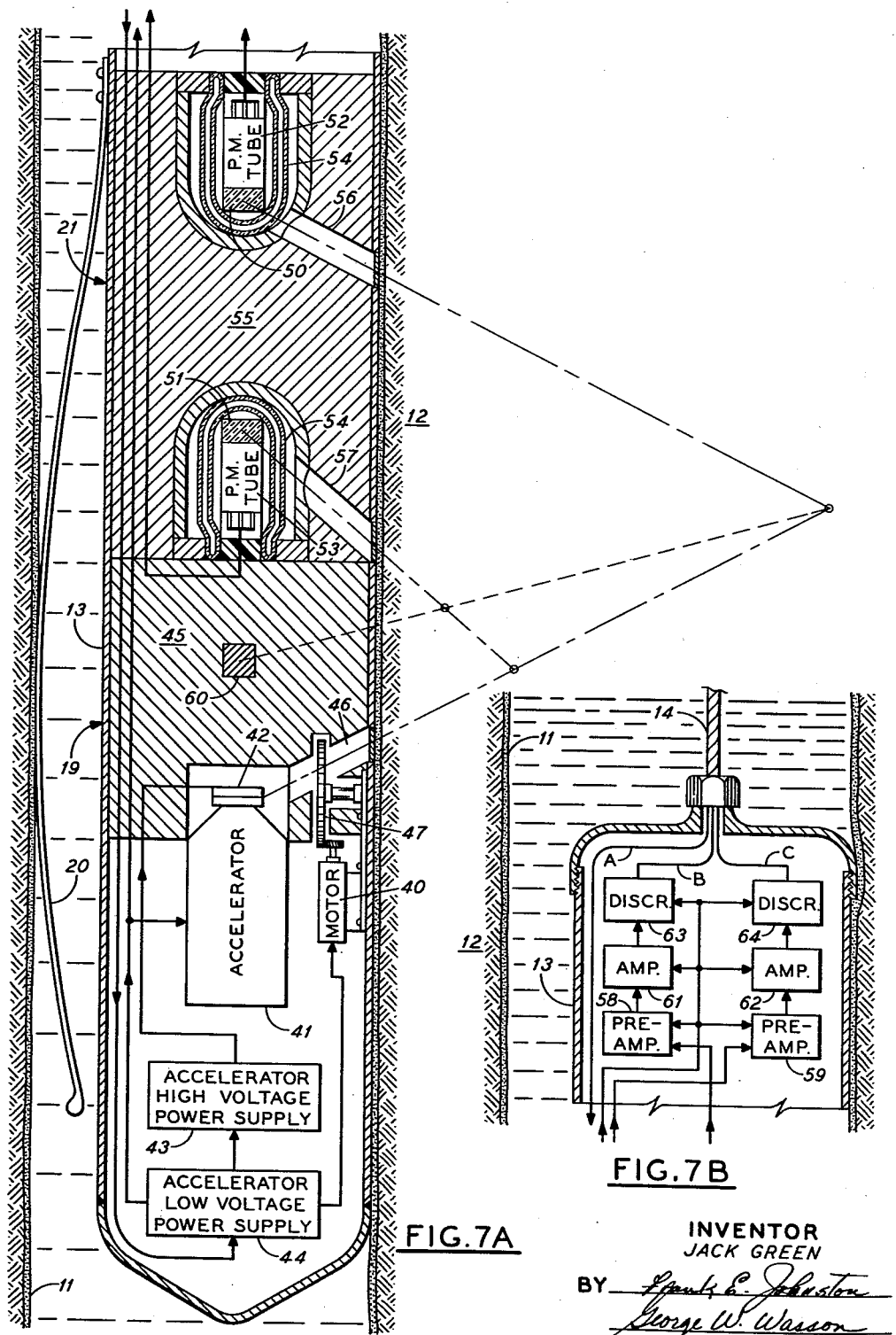

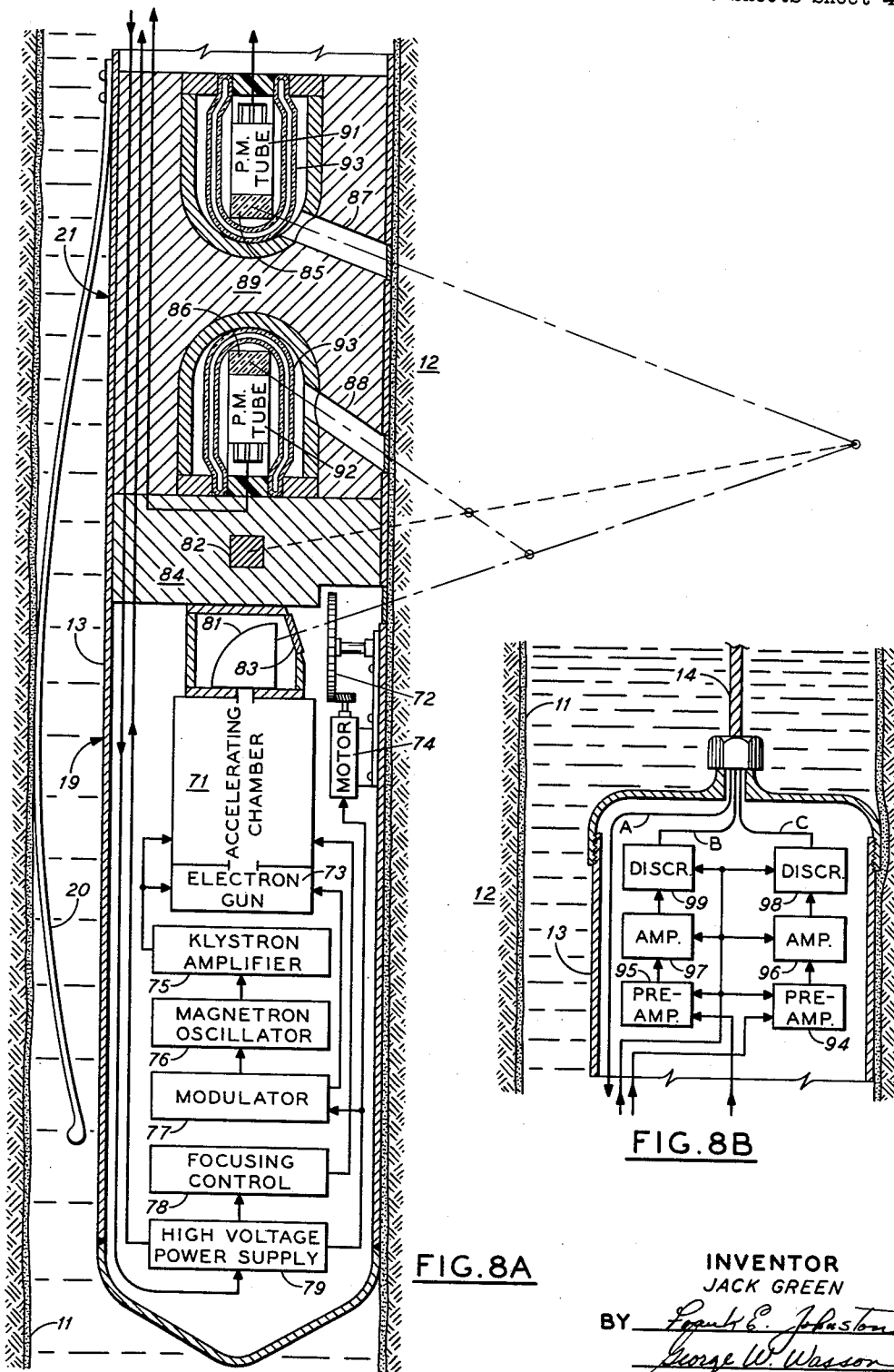

Oct. 30, 1962    J. GREEN    3,061,725
COMPARISON LOGGING OF GEOLOGIC FORMATION CONSTITUENTS
Filed March 3, 1958    5 Sheets-Sheet 5

INVENTOR
JACK GREEN
BY
ATTORNEYS

United States Patent Office 3,061,725
Patented Oct. 30, 1962

3,061,725
COMPARISON LOGGING OF GEOLOGIC
FORMATION CONSTITUENTS
Jack Green, La Habra, Calif., assignor to California Research Corporation, San Francisco, Calif., a corporation of Delaware
Filed Mar. 3, 1958, Ser. No. 718,857
21 Claims. (Cl. 250—83.3)

This invention relates to methods of and apparatus for radioactivity well logging and, more particularly, to a method of and apparatus for determining the presence of petroleum crude and carbonate formations in any earth formation penetrated by a well bore.

It has long been desired to have a logging method that would directly detect oil itself, or some constituent of oil, such as carbon, but no such log is presently available to the petroleum industry. An accurate carbon log would provide valuable information concerning the probabilities of petroleum accumulations within an earth formation and, furthermore, such a log would have possible uses other than the detection of oil for it is sometimes important to log the concentration of carbon in formations surrounding a well bore in order to evaluate carbonate content of various formations. Furthermore, concentration of inorganic carbon as carbonate in clastics may constitute a permeability barrier increasing the density and reducing the porosity in such earth formations. In some cases carbon concentration minima can be used to delineate intercalated anhydrite beds or admixed anhydrite in carbonate formations. Present carbon logs are not diagnostic of oil unless additional parameters are known. These parameters include (1) a quantitative estimation of carbon, (2) the ratio of carbonate carbon to organic carbon, and (3) the residual oil saturation of the formation being logged.

Some information is known about the disposition of carbon within earth formations and about the chemical form of this carbon. The average quantity of carbonate cement in sandstones is estimated to be about 8% indicating an average of 1% for carbon; the average quantity of immobile organic carbon (as distinguished from liquid hydrocarbon) is about 1%. These amounts of carbonate cement may vary within wide limits both areally and vertically within a formation and the immobile organic carbon may also vary, but within any formation this variation of immobile organic carbon is usually less extreme than is the variation in carbonate cements.

In many areas the problem of distinguishing the carbon of the carbonate and immobile organic material from the carbon of liquid hydrocarbon is severe, particularly because in the flushed zone surrounding the well bore, a small amount of carbonate cement may look like oil. For example, in the flushed zone, where the residual oil saturation may be less than 35%, there may be more carbon in the rock if the pore space is filled with calcite cement than if it is filled with oil and water. On the other hand, where residual oil saturations may be greater than 35%, there will be more carbon in the rock if the pore space is filled with oil and water than if it is filled with calcite cement. Present day carbon logs which record total carbon (carbonate plus organic carbon, including liquid hydrocarbon) may show a minimum response to variations in liquid hydrocarbon.

Because the amount of carbonate cement and immobile organic carbon does not vary in the flushed zone, and because liquid hydrocarbon does, a two-curve carbon log comparing carbon in the flushed zone to carbon in the unflushed formation will resolve the problem of the combined contribution of carbon in the form of carbonates and carbon in immobile and mobile organic material. A two-curve carbon log, in principle, is a log so modified as to give one set of carbon concentrations near the bore hole (in the flushed zone) and one for carbon more remote from the bore hole. The two-curve log would enable measurements to be made of the change of carbon concentration in the flushed zone caused by the drilling of the well bore for the only carbon that would be so affected (i.e. flushed away) would be the carbon of liquid hydrocarbons.

The occurrence of carbon in sedimentary rocks may appear in three different forms: carbonates, immobile organic carbon and mobile organic carbon. The carbonates include the cementing materials that bond the common rock making minerals to form various earth formations and include the following forms: quartz, dolomite, calcite and anhydrite. A considerable amount of investigation has been performed to compute the average probability of the occurrence of carbonates within earth formations and an expectable average is thought to be about 8%, the equivalent of 1% carbon.

In addition to the carbon of carbonates and the carbon of liquid petroleum, there is another source of carbon in sediments; that is, immobile organic carbon occurring in the form of kerogen, solid hydrocarbons, woody material and coal. Extensive experiments concerning the distribution of immobile organic carbon have been performed with the average quantity of immobile organic carbon indicated to be about 1%; this being not far off from the average quantity of inorganic carbon (e.g., calcium carbonate) in sandstones. One conclusion that may be drawn from the comparison of immobile organic and inorganic carbon is that because immobile organic carbon content is generally of the same order of magnitude or larger than that of the inorganic carbon, and as pointed out previously, because the range of variation of calcium carbonate (the inorganic carbon) is rather extreme, both areally and laterally, for any given formation, immobile organic carbon would be likely to be present as a high and fairly constant background on which inorganic carbon would produce its previously stated variations.

The remaining source of carbon in sedimentary rocks is in the form of mobile organic carbon including liquid hydrocarbons and gaseous hydrocarbons. It is the determination of the presence of this form of carbon that is most desired in the logging of earth formations for petroleum production zones. There is, however, the problem of distinguishing between the carbon in liquid hydrocarbon and carbon of carbonates where, to the log of total carbon, a little oil may look like a lot of calcite. Oil, for example, contains 85% carbon; pure limestone, 12%. A non-calcareous rock sample containing only 14% of oil by weight would be equivalent to a rock made up of 100% calcite. One percent by weight of carbon is contained in a rock having either 1.2% by weight of oil or 8.3% by weight of calcite. The foregoing indicates the need for determining the physical-chemical difference in the form of the carbon contained in a given formation.

The presence of carbon in the form of oil within a porous rock formation is dependent upon the residual oil saturation of the pore spaces of the rock where "residual oil saturation" is defined as the volume percent of oil in the pore space of a rock. For example, 100% residual oil saturation is the complete filling of rock pore spaces with oil. Normally, residual oil saturation is less than 35%; that is, the pore volume is filled with less than 35% by volume of oil, and greater than 65% by volume of water, gas, or water and gas.

The effect of flushing the oil from around the bore hole by mud filtrate formerly intensified the problem of distinguishing liquid hydrocarbons from carbonates through the use of a total carbon log. In the process of drilling a well bore through an earth formation, the drilling fluids employed will effect a removal of hydrocarbons from the pore spaces of the earth formations contiguous to the well bore so that the oil saturation in the pore spaces of the earth formations contiguous to the well bore will be more than likely greatly reduced. Most residual oil saturations are less than 35%. If we consider two cases; one where a sandstone is filled with oil of 35% or less residual oil saturation and the second where a sandstone of the same porosity is cemented by calcium carbonate, it follows that a log of carbon at the well bore face will see more carbon in the form of carbonate whose concentration is not affected by the flushing process. Immobile organic carbon, not considered in the above discussion, will also remain constant in the flushed zone and will add to the carbonate carbon and the carbon of liquid hydrocarbons.

To summarize the above, unless some means are taken to record different carbon concentrations at different depths of penetration into an earth formation from the well bore, the carbon log would merely record variations in the total carbon (carbonate, immobile organic, and liquid hydrocarbons) of which liquid hydrocarbon variations could be of least significance. Thus, in a sandstone of given porosity there would be more carbon in the rock if this pore space were filled with immobile organic and/or inorganic carbon than if this pore space were filled with water and oil of 35% or less residual oil saturation.

The method of the present invention and the suggested apparatus for the performance of the method contemplates the logging of carbon in an earth formation in a manner whereby the carbon in the flushed zone consisting essentially of the immobile organic carbon and inorganic carbon may be compared to and distinguished from the carbon within an earth formation spaced from a well bore and therefore less affected by the flushing action of the drilling fluids used in the penetration of the well bore into the earth formation. As has been previously defined, a comparison of the total carbon in these two positions will permit a change in the carbon logged to be interpreted as an accumulation of carbon in the form of liquid hydrocarbons. The present invention suggests the logging of these carbon accumulations through the use of nuclear spectroscopy techniques whereby certain nuclear reactions will either be confined to particular depths of penetration or whereby the detection of nuclear reactions will be confined to those reactions occurring within selectable radial distances from the center of the well bore. The suggested nuclear spectroscopy logging of the formation constituents may yield the accumulations of constituent elements other than carbon and, through comparison of these other elements with the log of carbon accumulations, the chemically combined form of the carbon with other elements may be determined both radially from the center of the well bore and axially along the well bore. Radial variations of carbon and other constituent elements may be used to determine the type of formation being logged and the type of cementing materials for the clastics within the formation. Axial variations in the logs of the constituent elements of the formation may be used to determine lithological changes and the presence of stratigraphic traps within an area, as well as information concerning the degree of carbonate cementation of certain geologic formations.

There are many things which may be derived from the nuclear spectroscopic logging of carbon in an earth formation; included in these are the direct detection of oil in carbonate-free formations, and the delineation of permeability traps by carbonate cementation in clastics. The two-curve carbon log implements the determination of the above because the amount of carbonate cement and immobile organic carbon does not vary in the flushed zone while carbon in the form of oil does. A two-curve calcium and carbon log would therefore resolve the problem of the combined contribution of carbon by carbonates, by immobile organic carbon, and by liquid hydrocarbons. This two-curve calcium and carbon log is a carbon log so modified as to give one value of carbon and calcium concentrations contiguous to the bore hole (in the flushed zone) and one of carbon and calcium concentrations more deeply spaced from the bore hole and within the earth formations. These two-curve logging measurements may be compared to enable measurements of the change of carbon concentration in the flushed zone, and, in that the carbon concentration that would be so effected would only be that of the carbon of liquid hydrocarbons, the indication of a change of carbon concentration would therefore be an indication of the presence of carbon in the form of mobile hydrocarbons. If the two-curve carbon logs show no change in concentration of carbon with depth into the formation, then in clastics the record of carbon concentration will indicate in an absolute sense the degree of carbonate cementation if immobile organic hydrocarbons are absent.

Reference should be had to the copending applications of Paul E. Baker, Serial No. 666,538, now Patent No. 3,015,029, for "Gamma Ray Source With Lithium Target" filed June 19, 1957; of Stanley B. Jones, Serial No. 671,469, now Patent No. 3,015,030 for "Method and Apparatus for Logging Carbon" filed July 12, 1957 and of Delmar O. Seevers et al., Serial No. 699,657 filed November 29, 1957, all assigned to the assignee of the present application, wherein are defined the arts of radioactivity well logging through the bombardment of subsurface formation with high-energy X rays, $\gamma$ rays and neutrons for the production of nuclear spectroscopy signals defining, among other things, the presence and concentration of certain elements in the irradiated subsurface formations. The first of the above-identified applications relates to the elastic scattering of 15 m.e.v. (million electron volt) $\gamma$ rays by carbon nuclei and the resultant nuclear spectroscopy signals. Briefly, this method is based on the unique reaction of carbon nuclei to $\gamma$ rays of an energy of 15.09 m.e.v. Gamma rays of this energy are elastically back-scattered, with substantially the same energy, by collision with carbon nuclei so that measurements of the amount of back-scattered 15.09 m.e.v. $\gamma$ rays after bombardment of a formation with 15.09 m.e.v. $\gamma$ rays provides an indication of the concentration of carbon in the earth formation. A reaction with a calcium nuclei may be developed in a similar manner so as to produce a nuclear spectroscopy peak separately designating the presence of calcium and its concentration in the earth formation.

The detection of back-scattered 15.09 m.e.v. $\gamma$ rays from carbon nuclei as defined in the Baker application lends itself well to the two-curve carbon log of the present invention since, with initial radiation at the high-energy level of 15.09 m.e.v., there is an exceedingly large probability of the irradiating $\gamma$ rays being elastically scattered by a carbon nucleus due to the enormous cross section of the carbon nucleus for this scattering process. The cross section of carbon for this reaction is about 30 barns whereas the cross section for most other nuclei that display elastic scattering of $\gamma$ rays in this energy region is only of the order of 1 to 10 millibarns. Thus, in view of the substantial disparity between the probabilities of elastic scattering of $\gamma$ rays of this energy level by the carbon nuclei as compared to other nuclei, the presence in the bore hole of appreciable quantities of elastically scattered $\gamma$ rays, at this energy level, provides a reliable indication of the presence in the bombarded formation of appreciable amounts of carbon.

It is a case of statistical probabilities as to whether the above reaction with a carbon nucleus will take place contiguous to the well bore or spaced from the well bore within the earth formation and, because this reaction may take place in either of these locations, a source and two detectors properly collimated will be restricted to indications of the intensity of back-scattered $\gamma$ rays from the carbon nuclei within each of two predeterminable areas of the penetrated earth formation. Gamma rays of the 15.09 m.e.v. energy level may penetrate many feet into the earth formation to react with carbon atoms spaced from the well bore face as well as those within the flushed zone contiguous to the well bore. Furthermore, the nuclear spectroscopy indications of the detector may be confined to γ rays having energies in the region of 15.09 m.e.v. since, as above stated, the cross section of carbon for γ rays of energy above and below 15.09 m.e.v. is very small.

The second of the above-identified copending applications defines an alternative source for irradiating an earth formation with X rays having a spectrum of energies in the region of 15.09 m.e.v. As above, these X rays may also penetrate deeply into the earth formation to the order of several feet and have the same statistical probability of reaction with carbon nuclei contiguous to the well bore and spaced from the well bore as do the γ rays of the foregoing paragraphs. X rays within the above energy regions include those having the energy of 15.09 m.e.v. for which the cross section of the carbon nucleus is extremely large for the elastic scattering process. Thus, through the use of suitable radiation detectors sensitive to the back-scattered X rays within the predeterminable energy ranges and the use of proper collimators to separate the radiations from the preselected desired depths of penetration within the earth formation, a nuclear spectroscopy log may be produced identifying the presence and relative position of carbon within an earth formation.

An entirely different method for producing a two-curve carbon log of the earth formations contemplates the use of a source of 14 m.e.v. fast neutrons for irradiation of the earth formation. The irradiation of the earth formation with these fast neutrons produces 4.43 m.e.v. γ rays from carbon through an inelastic scattering process and also 12 to 13 m.e.v. bremsstrahlung from β rays emitted by boron-12 in turn generated by transmutation from carbon-12 by the 14 m.e.v. neutrons. The depth of penetration through rock for the 4.43 m.e.v. γ rays is limited to a probable maximum of 18 inches whereas the penetration through rock for the 12 to 13 m.e.v. bremsstrahlung from boron-12 is about 36 inches. The detection of a nuclear spectroscopy signal including the above two radiations lends itself to a comparison of intensities of the two radiations to indicate the difference in concentration of carbon at two depths within an earth formation from the bore hole wall. Thus this method is based on energy discrimination of the detected γ radiation. Only one, if any, collimating means is required.

Still another entirely different method for producing a two-curve carbon log of the earth formations contemplates again the use of fast neutrons for irradiating of the earth formation. The source again yields fast neutrons at an energy level of 14.2 m.e.v. and is intended to produce nuclear reactions between neutrons and carbon nuclei at a variety of distances into the earth formations throughout the invaded zone. The inelastic scattering reaction of neutrons of this 14.2 m.e.v. energy level with a carbon nucleus produces a γ ray of 4.43 m.e.v. that may be detected in a properly collimated detector. A single source may be provided with detectors accepting 4.43 m.e.v. γ rays from the formation at two angles by means of two different collimation means. Each detector samples the carbon concentration at separate distances into the formation.

In all of the above suggested methods, an indication is provided of the carbon concentration at two different radial distances from the axis of the bore hole. One of these indications is restricted to the carbon concentration at the face of the well bore and generally within the 2 to 4 inch thick flushed zone contiguous to the well bore face. The other is from carbon concentrations spaced between 5 to 36 inches within the earth formation in an area, as previously defined, where there will be reduced or no lessening of the carbon concentration from the drilling process. From these two indications a difference of carbon concentration may be determined; this, as previously stated, may then give valuable information concerning the probability of petroleum accumulations within the earth formation, the probable lithology of the formations and information concerning the cementing materials joining the clastics within the formation. From these indications determinations may also be made concerning the porosity of the formation.

Because all of the above reactions can produce nuclear spectroscopy signals which are electronic in nature, the curves may be electronically amplified and bucked against each other to produce maximum sensitivity and an easily obtained indication of differences in detected carbon signals.

The techniques of the three nuclear spectroscopy measurement methods just described as well as other methods presently known for determining information concerning constituent elements within an earth formation may also be used to determine the presence of certain particular elements with which carbon is most likely to be combined. As previously stated, it is the presence of carbon in the form of calcium carbonate that may be used for comparison with carbon in other forms to determine the presence of hydrocarbons in an earth formation. A nuclear spectroscopy log that will provide an indication of calcium as well as carbon may therefore define the presence of calcium carbonate. The comparative logging of calcium with carbon for different depths of radial penetration will provide the determination of the hydrocarbon accumulations as hereinbefore defined and, where calcium is logged without changes in carbon accumulations, may provide information concerning the cementing materials joining discrete rock formation particles or clastics. In this manner, lithology and lithological changes may be determined from which the porosity of a formation may be determined as well as the probabilities of permeability traps within penetrated formations. Furthermore, by comparing calcium, carbon and calcium carbonate concentrations within an area by a plurality of measurements made different wells within the area additional information may be derived concerning the stratigraphy as well as the direction and orientation of sandy particles comprising the formation being logged. Also carbon and hydrogen concentrations can be compared wherein, for a given porosity, hydrogen will have minimum concentration for maximum oil saturation.

From the foregoing discussions, it is therefore an object of the present invention to provide a method and apparatus for determining the presence of petroleum crude by a differential comparison of carbon atoms within an earth formation penetrated by a well bore through the use of nuclear spectroscopy measurements.

A further object of the present invention is the provision of a method and means for detecting the presence of petroleum crude accumulations in an earth formation penetrated by a well bore by detecting the presence of and relative concentrations of carbon atoms in the earth formation contiguous to and spaced from the circumferential face of the well bore.

A further object of the present invention, in accordance with the preceding object is the determination of porosity in its relation to the discovery of permeability traps within an earth formation through the detection and comparative location of carbon atoms as carbonate and organic carbon in an earth formation at the face of a well bore and laterally spaced therefrom.

A further object of the present invention is the provision of a method of and apparatus for determining lithology and lithological changes within an earth formation penetrated by a well bore by determining the presence of certain constituent materials in chemical combination form within an earth formation and the changes in quantitative presence of certain elements of said combinations radially from a well bore penetrating said formation, axially along said well bore and in different spaced well bores within said formation.

Other objects and features of the invention will be readily apparent to those skilled in the art from the specification and appended drawings illustrating certain preferred embodiments in which:

FIGS. 7A and 7B are sectional views partially in schematic indicating a logging sonde for the irradiation of an earth formation with γ rays.

FIGS. 8A and 8B are sectional views partially in schematic indicating a logging sonde for the irradiation of an earth formation with X rays.

Figures 1, 10:
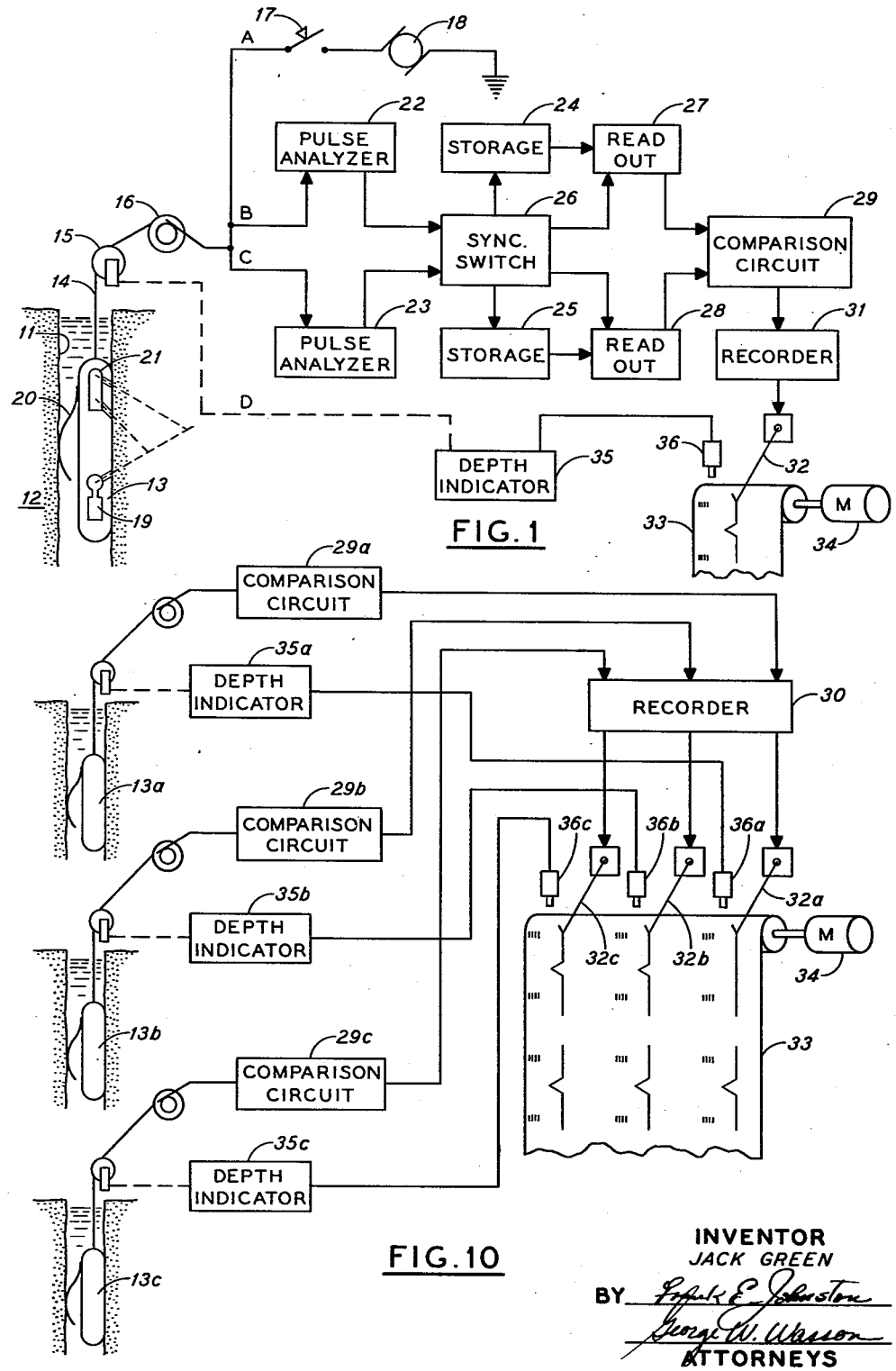
FIG. 1 is a schematic representation of a logging sonde and its energization and analysis circuits for the performance of the method of the present invention.
FIG. 10 is a schematic representation of an analysis and recording system for preparing a multiple curve log with the method and apparatus of the present invention.

Referring now to the apparatus of FIG. 1 wherein a well bore 11 is illustrated penetrating an earth formation 12. A logging sonde 13 suspended on a cable 14 passing over pulley 15 and wound upon reel 16 is illustrated suspended within the well bore 11 in a position to irradiate the earth formation 12 and receive nuclear spectroscopy signals from the constituent elements of the earth formation. Cable 14 both supports the sonde 13 and provides electrical conductors for connecting the sonde 13 to the control and analysis circuits at the earth's surface. A bow spring 20 maintains the sonde 13 pressed against the face of the well bore 11 to insure proper coupling for the irradiation.

The control for the energization of the logging sonde 13 is provided by a switch 17 through which electrical power from a generator 18 is connected to the sonde 13. The switch 17 and other control circuits within the sonde 13, to be hereinafter described, activates a source of high energy radiation 19 for the irradiation of the earth formation. The radiation from the source 19 is preferably properly collimated for a particular preselected angle of radiation into the formation. The logging sonde 13 is provided with a detector 21 spaced and shielded from the source 19 for the detection of the nuclear spectroscopy signals definitive of the constituent elements of the earth formation. The detector 21 is provided with pre-established collimation so as to receive nuclear radiation signals from particular depths within the formation from the irradiation by the source 19. The detected signals from the detector 21 are transmitted to the earth's surface over cable 14.

The signals from detector 21 are applied to the analysis, comparison and recording circuits at the earth's surface for the purposes of the method of the present invention. The detected signals from the two predetermined depths of penetration within the earth formation are individually applied to separate pulse analyzers 22 and 23 where the signals may be amplified, sorted and converted to a proper form for analysis. The output of the analyzers 22 and 23 are applied separately to storage devices 24 and 25 through a synchronizing switch 26. The storage devices 24 and 25 may constitute a cathode ray storage tube as is presently known in the art. The synchronizing switch provides a programming control for the storage tubes so that each will have its information stored therein at time, energy or other coincident parameters of identification and the switch also may determine the period of accumulation of information in the storage means so that information withdrawn from the storage means may be removed at preselected time intervals.

Upon the completion of an irradiation cycle or upon the accumulation of a particular preselected time of storage, as determined by preprogramming or by control in the synchronizing switch, the information stored in the storage devices 24 and 25 is withdrawn by the readout circuits 27 and 28 and transmitted to a comparison circuit 29. In the comparison circuit 29 the individual signals from the predetermined depths of penetration for the irradiation in the earth formation are compared to establish a difference signal, if existent, between the spectrum of γ rays as derived from the different depths of penetration.

The output of the difference signal from the comparison circuit 29 is transmitted to a recorder 31 and by inking stylus 32 to record paper 33. The record is driven by a motor 34 and may either be continuously rotated or may be synchronized with operation of the readout circuits 27 and 28 to provide a record only on the withdrawal of information from the storage devices 24 and 25. A depth indicator 35 mechanically driven from the pulley 15 may be provided to actuate a depth marker 36 at the record 33.

From the simplified schematic diagram of FIG. 1 it may be seen that nuclear spectrum signals from different depths of penetration within an earth formation as derived in manners to be hereinafter defined may be transmitted to conventional analyzing, storage and comparison circuits for the derivation of difference signals between the detected spectra. Each of the components of the circuit of FIG. 1 is conventional in the art and its operation with other circuits of the diagram is well known and adequately described in material within the public domain. The particularities of the circuits, aside from the combination shown, form no part of the present invention and, for that purpose, will not be further defined than as herein shown.

Figure 2:
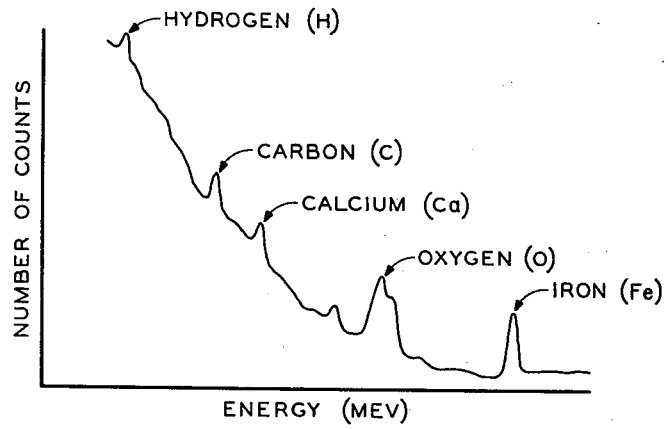
FIG. 2 is a γ ray spectrum as derived in nuclear spectroscopy measurements.

FIG. 2 illustrates a spectrum of γ rays indicating well-known peaks definitive of certain elements. It may be seen from FIG. 2 that the calcium and carbon peaks occur close to each other and provide a simple area of identification for these elements. As will be hereinafter defined, the spectrum of FIG. 2 may be restricted to the γ rays of the energies including calcium and carbon peaks and, unless information is intended to be derived from other peaks such as hydrogen, oxygen, sulphur, potassium, magnesium, chlorine and iron, these other peaks may be eliminated by suitable well-known discriminators.

Figure 3:
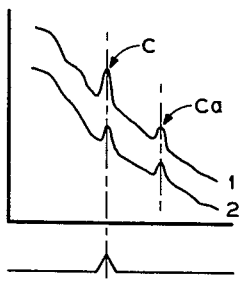
FIGS. 3 through 6 are partial γ ray spectra indicating the two-curve logging of the present invention and the record as will be produced with the recorder of FIG. 1.
Figure 4:
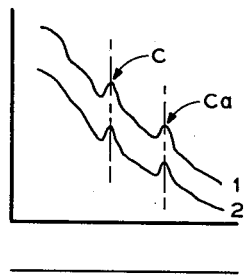
Figure 5:
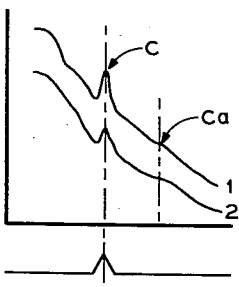
Figure 6:
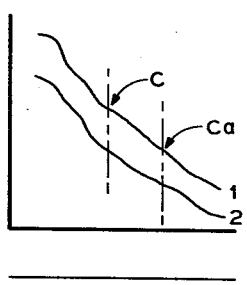

FIGS. 3 through 6 indicate portions of γ rays spectra as will be derived from the storage tubes 24 and 25 and as transmitted to the comparison circuit 29. In each of these figures the trace marked "1" is the spectrum of the deep penetration within the earth formation and the trace marked "2" is the spectrum of the detected signals from the flushed zone adjacent to the well face of the well bore 11. Appearing below the γ ray spectrum traces of each of these figures is an indication of the recorded output from the recorder 31 on the record 33 as would be derived upon the occurrence of a difference signal between the two traces. The records of FIGS. 3 and 5 indicate the presence of petroleum through an unbalance in the carbon γ ray detection wherein the detection from the deep radiation (1) indicates more carbon than is present at the well face (2). FIG. 3 differs from FIG. 5 in that FIG. 3 indicates a calcium carbonate formation whereas FIG. 5 has no γ ray signal from calcium. The signal of FIG. 5 may be derived from a sandstone formation where no calcium is present. FIGS. 4 and 6 indicate comparative spectra derived from a formation where no petroleum crudes are present and where FIG. 4 indicates a calcium carbonate cementing material and FIG. 6 indicates the absence of calcium and carbon.

FIGS. 7A and 7B illustrate a logging sonde for the generation of the high-energy γ rays and for the detection of γ radiation from the irradiated formation. In the sonde of FIGS. 7A and 7B the detector 21 constitutes a pair of detectors each separately collimated for radiation from particular depths of penetration for the irradiation from the source 19. The source 19 provides irradiation for the different depths of penetration each being separately collimated for the depths desired. As was previously defined, the γ rays desired for this nuclear reaction are at the energy of 15.09 m.e.v. and may be, as herein illustrated, generated by the acceleration of protons for the bombardment of a lithium target. For this purpose a proton accelerator 41 of any suitable type, such as a Cockroft-Walton generator or a Van de Graaff generator, is provided. Power is supplied to the accelerator 41 from a high voltage power supply 43 and a low voltage power supply 44. Protons of the required energy are produced in the proton accelerator 41 and are accelerated toward a lithium target 42 for the bombardment and generation of the γ rays of the prescribed energy. As is defined in the copending application of Paul E. Baker, Serial No. 666,538, the bombardment of the target 42 by the proton beam produces emission of γ rays having an energy of 17.6 m.e.v. and γ rays having an energy centered at 14.8 m.e.v. The γ rays produced by the bombardment of the target 42 enter the formation 12 and, with respect to the 17.6 m.e.v. γ rays, the Compton scattering thereof changes the line spectrum to a continuous spectrum which spectrum includes γ rays having an energy of 15.09 m.e.v. Similarly, the γ rays emitted by the target 42 having an energy centered at 14.8 m.e.v. and extending for 1 m.e.v. on either side of this center will enter the formation and of these the rays of energy 15.09 m.e.v. will be back-scattered by carbon nuclei.

The accelerator 41 and the target 42 are shielded to prevent the γ rays generated in the accelerator from reaching the detector 21 directly. For this purpose, the shield 45 may be made of lead, bismuth, uranium 238 or other heavy material and is further provided with a collimated path 46 for directing the γ ray radiation from the accelerator at the desired angle into the formation.

As was described in the preceding remarks concerning the method of this application, the radiation of the earth formation with the γ rays of the herein described energy provided for the elastic back-scattering of γ rays having an energy of 15.09 m.e.v. from carbon atoms. The γ rays of this energy are received in the detector 21 and, the signals therefrom through associated circuits are prepared for transmittal through the cable 14 to the pulse analyzers 22 and 23. The detector may constitute an ionization chamber, or, as shown, a scintillation counter comprising scintillation crystals 50 and 51 and photo-multiplier tubes 52 and 53. Each of the counters are disposed in a Dewar flask 54 and both of the detectors are shielded from the accelerator 41 by suitable shielding 55. The shielding 55 is provided with collimated paths 56 and 57 directing the γ radiation from the earth formation toward the crystals 50 and 51, respectively.

The output signals from the photo-multiplier tubes 52 and 53 are supplied through separate preamplifier stages 58 and 59 to amplifiers 61 and 62 and then to discriminators 63 and 64, respectively. The discriminators 63 and 64 are adjusted to discriminate against signals both above and below the area of the γ ray spectrum for which the comparison of the method of the present invention is selected, and the discriminated output signal is supplied for transmission on cable 14 to the earth's surface for analysis, comparison and recording. The conductors and mechanical connections, designated A, B and C in FIG. 7B correspond to the conductors and mechanical connection similarly identified in FIG. 1 so that energization for the accelerator 42 is provided through conductor A to the power supplies within the sonde 13 and the signals from the discriminators 63 and 64 are connected to the analyzers by conductors B and C at the earth's surface.

A rotatable carbon shutter is provided at 47 in the collimation path 46 of the γ ray beam from the accelerator 41 so that the irradiation of the earth formation by those 15.09 m.e.v. rays emanating directly from the accelerator will be interrupted in accordance with the rotation of the shutter. Motor 40 is energized from the power supply 44 and drives the shutter 47 at the desired speed. In this manner the nuclear spectroscopy signals received at the scintillation crystals 50 and 51 will be pulsed in accordance with the pulsing of the irradiation beam from accelerator 41. (Of course, those rays originally at 17 m.e.v., or some energy higher than 15.09 m.e.v. may be reduced to 15.09 m.e.v. by Compton scattering in the formation but will not be modulated by the carbon shutter when received at the detector.)

A neutron source is provided at 60 for irradiation of the earth formation 12 with fast neutrons. The source may be a capsule of powdered polonium and beryllium and is shielded from the scintillation crystals 50 and 51 by the shielding materials 45 and 55. The irradiation of the earth formation with fast neutrons provides for the detection of nuclear spectroscopy signals from other elements within the earth formation. Signals derived from the neutron irradiation may be distinguished from the signals derived from the γ ray irradiation by the modulation produced by the rotation of the shutter 47 and may be detected in the crystals 50 and 51.

FIGS. 8A and 8B illustrate a logging sonde for the irradiation of an earth formation with high energy X rays in the range of the 15.09 m.e.v. level for which the carbon atom has a high probability of elastic collision. In the logging sonde of FIGS. 8A and 8B the source 19, as shown in FIG. 1, constitutes the lower portion of the sonde and the detector 21 of FIG. 1 is again divided into two detectors one for each of the desired depths of penetration for the radiation sampling. The sonde 13 generally comprises a particle acceleration and radiation generating section and a radiation detecting section. The method of generating the X rays having the energy spectrum required for the present invention is that of bombarding a suitable target with accelerated electrons having an energy of approximately 16 m.e.v. Such electron acceleration may be produced in an accelerating chamber 71 to which electrons are supplied from an electron gun 73. The electron gun 73 is supplied from a source of high frequency power such as a klystron amplifier 75 which is in turn controlled by a magnetron oscillator 76. A modulating network, generally designated 77 is provided to control the magnetron oscillator 76, klystron amplifier 75 and the electron gun 73. A focusing control network 78 is connected to supply a focusing control signal to suitable means such as a coil, not herein shown, wound along the length of the accelerating chamber 71, to control the axial focusing of the accelerated electrons in the chambers. A suitable high voltage power supply network 79 is also provided in the sonde 13 to supply high voltage power to the different components of the acceleration and detection units.

The electrons accelerated in chamber 71 attain an energy of approximately 16 m.e.v. and emerge from the accelerating chambers to be deflected through an appropriate angle by magnet 81 directing the electrons toward target 83 which emits the desired X rays as a result of the electron bombardment. The target 83 may be of any suitable material, such as tungsten as is well known in the art, and the X rays from the target, having a spectrum of energy covering at least the region of 14.8 m.e.v. to 15.4 m.e.v., thus emerge from the sonde 13 as a beam directed in the proper angle to attain the desired depth of penetration into the earth formation.

The radiation back-scattered from X ray bombardment of the formation 12 is detected by the energy-measuring arrangement of the upper portion of the sonde 13. The detecting portion includes a pair of scintillation crystals 85 and 86 which are exposed to selected back-scattered radiation from the formation through collimated paths 87 and 88 in shielding material 89. Photomultiplier tubes 91 and 92 are individually associated with each of the crystals 85 and 86, respectively, and these elements are mounted in a pair of Dewar flasks 93 for thermal insulation during the downhole run. The shielding material 89 shields the scintillation counters against X rays coming directly from the accelerator and target and provides a means for absorbing undesired $\gamma$ and other radiation from the formation and the sonde 13. The electrical output of the photomultiplier tubes 91 and 92 are supplied to preamplifiers 94 and 95 associated with each of the scintillation counters. The output of the preamplifiers is fed to amplifiers 96 and 97 and thence to discriminators 98 and 99 where signals below a predetermined level are eliminated, so that only the signals from individual X rays representing radiation within a predetermined energy level are transmitted through the cable 14 to the analyzing, comparison and recording circuits at the earth's surface. As in FIG. 7, the FIG. 8 downhole components are connected to units at the earth's surface through conductors A, B and C so that the sonde of FIG. 8 is operated downhole in the same manner as the schematic illustration of FIG. 1.

The sonde of FIG. 8 is equipped with a rotatable carbon shutter 72 in the path of the X-ray radiation for modulating the irradiation of the earth formation. Motor 74, energized from power supply 79, drives the shutter 72 in the same manner as described for the sonde of FIG. 7. A source 82 of fast neutrons within suitable shielding 84 is provided for irradiation of the earth formation, as in FIG. 7, for the production of nuclear spectroscopy signals from other constituent elements within the formation.

The X-rays emerging from the formation 12 after being elastically scattered by the carbon nuclei will have an energy slightly less than that of the original X-ray irradiation, since the carbon nucleus does absorb a small amount of energy in recoiling, but this energy loss is only of the order of 10,000 electron volts of .01 m.e.v. so that its effect is negligible on the method of the present invention. The discriminators 98 and 99, with proper adjustment, may be adapted to be selective to the energy range of the radiation from calcium and carbon so that the traces of spectrum signals as illustrated in FIGS. 3 through 6 may be produced for storage and readout to the comparison circuits.

Figures 9A, 9B:
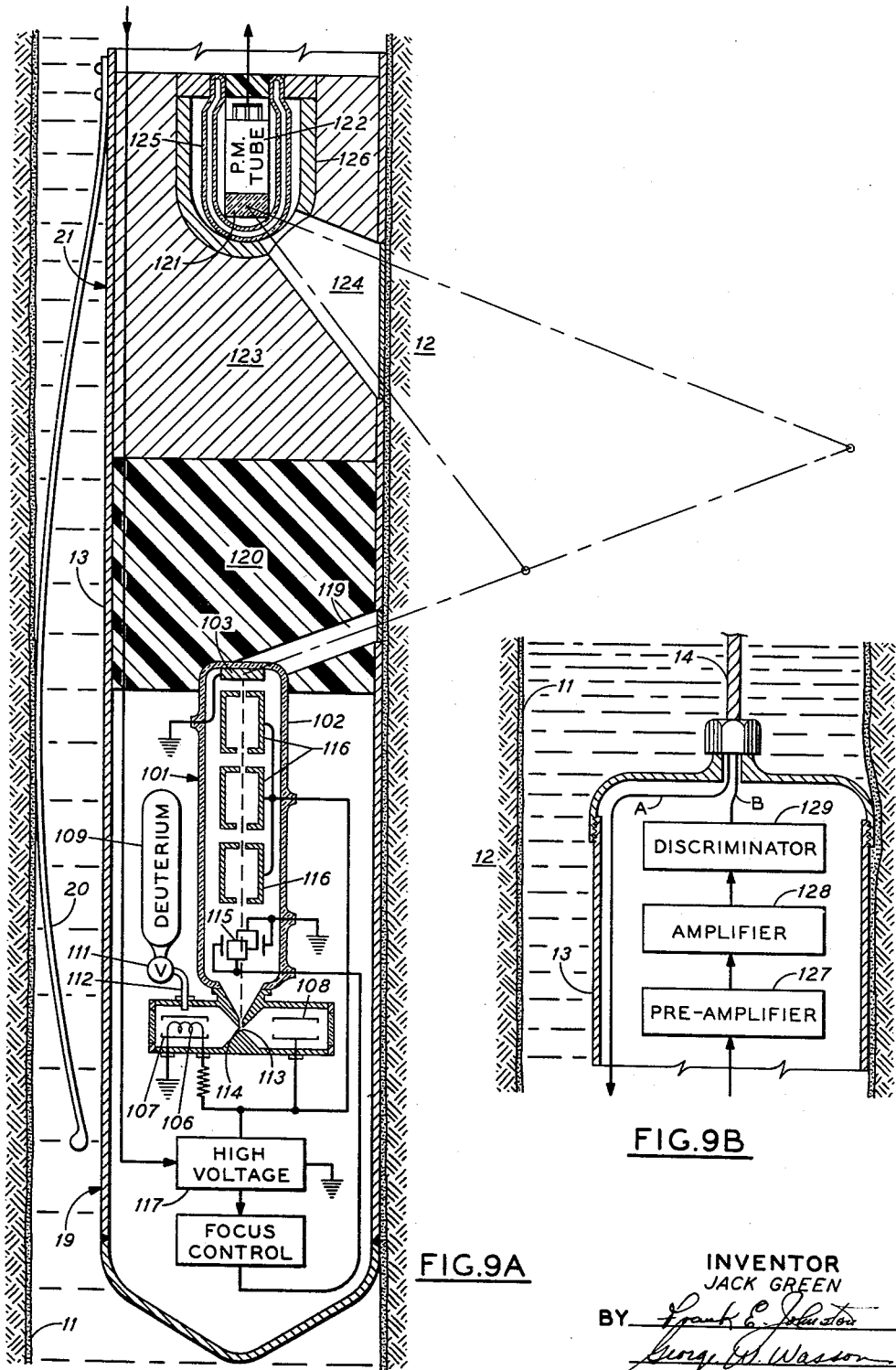
FIGS. 9A and 9B are sectional views partially in schematic indicating a logging sonde for the irradiation of an earth formation with fast neutrons.

FIGS. 9A and 9B illustrate another form for the logging sonde 13 with which the earth formations may be irradiated with fast neutrons to provide radiated $\gamma$ ray signals from carbon and other constituent elements at different depth of penetration into the earth formation being logged. In the apparatus of this figure the source is at the lower end of the sonde 13 and the detector at the upper end. The source constitutes a charged particle accelerator 101 including an elongated shell 102 forming an evacuated chamber enclosing a tritium target 103. Fast neutrons are generated by the accelerator through the bombardment of the tritium surface by accelerated deuterons.

In the accelerator 101 of FIG. 9 a heated filament 106 is arranged to generate ions and electrons from a cathode cylinder 107. As electrons are boiled off of cathode 107 they are attracted by the charge on anode cylinder 108. At the same time deuterons are generated in the cathode chamber by introducing a small leakage of deuterium gas from pressure bottle 109 through control valve 111 and tube 112. In the electron movement process, deuterons are produced by collisions between the accelerated electrons and the neutral deuterium gas atoms. Thus, deuterons are present in the stream flowing through restriction 113 and these positively charged particles may be attracted through the vertical passageway 114 to form a charged particle beam. This beam is then focused by focus control 110 energizing plates 115 and accelerated by electrodes 116 to guide the accelerated deuterons on to exposed portions of the target 103. Accelerating potentials for the beam of deuterons is provided by high voltage source 117 suitably connected to the accelerating portions and the ionization portions of the accelerator 101.

The tritium target 103 and the end of the accelerator 101 incorporating the target is encased within a shielding material 118 to prevent radiation of the high-energy neutrons directly toward the detector section 21 of the logging sonde. The shielding material 118 is also provided with a collimating path 119 for direction of the neutrons into the earth formation at a specific angle with respect to the logging sonde.

The detecting section of this form of irradiating apparatus is spaced from the source by a paraffin shield 120 and constitutes a scintillation counter including a scintillation crystal 121 and a photo-multiplier tube 122 enclosed within suitable shielding materials 123 provided with a collimating path 124 through which the $\gamma$ rays may pass. These $\gamma$ rays are produced by inelastic scattering of fast neutrons by elements constituting the formation and as a result of fast neutron reactions. The scintillation counter is enclosed within a Dewar flask 125 and the flask is shielded against $\gamma$ and other radiation from elements within the logging sonde by shielding members 126.

The output of the scintillation counter is transmitted to a preamplifier 127 and from the preamplifier to an amplifier 128 and thence to a discriminator 129 where undesired signals or signals outside of the area of the $\gamma$ ray spectrum being investigated may be eliminated. The output of the discriminator is carried along cable 14 to the components at the earth's surface as illustrated in FIG. 1.

The fast neutron source as shown in FIG. 9A provides for two forms of nuclear spectroscopy signal detections. In both forms, the earth formation is irradiated with fast neutrons having an energy of 14.2 m.e.v. with a distinction in the forms as to the type of reaction taking place with the carbon atoms spaced from the well bore. In the form shown in FIG. 9A, the fast neutron will develop $\gamma$ rays of 4.43 m.e.v. through the inelastic scattering process upon collision with a carbon nucleus. In addition, thermal neutron capture in calcium will produce a $\gamma$ ray of 6.4 m.e.v. The presence of 4.43 m.e.v. $\gamma$ rays, as detected in the scintillation counter 121 will therefore be an indication of the carbon content within the formation. This indication, by the apparatus of FIG. 9A, is not a location indication as the signal could come from contiguous atoms as well as distant atoms; however, a second reaction produced through irradiation with fast neutrons will be determinative of the carbon concentration spaced from the well bore.

The second reaction is the production of bremsstrahlung by $\beta$ rays from boron-12 yielded by the reaction of fast neutrons with carbon-12 ($C^{12}(N,p)B^{12*}$). The excited nucleus emits either of two $\beta$ rays of approximately 8.6 and 12.5 m.e.v. initial energies. These $\beta$ rays, or electrons, can be rapidly decelerated in the formation after emission from the excited $B^{12}$ nucleus and in this deceleration process the $\beta$ ray yields electromagnetic radiation, known as bremsstrahlung, that may have any energy up to a maximum of the initial $\beta$ ray energy. The initial $\beta$ ray energy will vary up to a maximum of 13 m.e.v. This bremsstrahlung radiation may be detected in the scintillation counter of FIG. 9. It is preferred to accept only bremsstrahlung of energy 12 to 13 m.e.v. to gain deep penetration on the average. Because the excited $B^{12}$ nucleus has a half life of approximately 27 milliseconds, the detection of bremsstrahlung may be coordinated with pulsing of the irradiation source as a further parameter for the selected radiation. The detection of 4.43 m.e.v. $\gamma$ rays and 12.5 m.e.v. bremsstrahlung may therefore determine the presence of and differentiate the location of carbon atoms within the irradiated earth formation.

A further modification of the apparatus, not specifically illustrated, for the performance of the method of the present invention through the use of a fast neutron irradiation source constitutes the combination of the source portion of the apparatus illustrated in FIGS. 9 and the detector portion as illustrated in either FIGS. 7 or FIGS. 8. In this modified form the source is the accelerator 101 for bombardment of the earth formation with fast neutrons having an energy of 14 m.e.v. The neutrons are inelastically scattered by carbon nuclei to produce γ ray radiation at 4.43 m.e.v. With properly collimated detectors, as in FIGS. 7 and 8, the radiation from the earth formation may be selected as to depth of penetration and, in this manner, the presence and location of carbon atoms may be determined for the comparison purposes of the present invention.

The determination of the presence of calcium and other constituent elements within an earth formation may be detected with the irradiation source of FIGS. 9 in a manner similar to that defined with respect to FIGS. 7 and 8. The fast neutrons from source 101 are thermalized by the earth formation and eventually are captured by the nuclei of formation atoms. The captured γ rays may then be detected in the scintillation counter to provide indications of the presence of the constituent elements.

The apparatus as disclosed in FIGS. 7 through 9 is intended to provide the radiation energies for the production of nuclear radiation including bremsstrahlung and X rays from the constituent elements of the earth formation in the manner as defined in the preliminary comments of this application. It should be evident how the comparison of signals derived from calcium and carbon may be used to indicate the chemical form of carbon within an earth formation and, particularly, carbon in the form of hydrocarbons. It should also be apparent how a comparative analysis of the presence of calcium and carbon or the lack of either one thereof may be determinative of the lithology of the formation being logged. It should also be apparent that the method of the present invention may be equally successfully employed in the comparison of the presence and location of other constituent elements to determine other characteristics of the formation such as porosity, permeability, salinity and, through the comparison to similar records taken in a plurality of well bores within a prescribed area, the lithological changes in and the direction and orientation of deposited sandy lenses or facies may be determined.

FIG. 10 illustrates a schematic form of comparison and recording circuits for the recordation and indication of lithological changes within an area being logged. In this figure a plurality of logging sondes 13 A, B and C are connected to separate comparison circuits 29 A, B and C and through the comparators to a single recorder 30. The recorder 30 is provided with an individual recording stylus 30 A, B and C for recording from each analyzer on a record 33 the individual unbalances as described with respect to FIG. 1. The record 33 is driven by motor 34 as the recorder is energized from the comparison circuits. A plurality of depth markers are driven from the separate depth indicators 35 A, B and C associated respectively with the individual sondes and the record 33 is provided with separate depth recorders 36 A, B and C. A grouping of separate traces from each of the comparators through the recorder 30 may be compared on the single record 33 and may be comparable horizontally and vertically as illustrated in FIG. 10 to indicate changes in the lithology of the formation as spaced by the respective positioning of the three logging sondes.

Throughout this specification and the appended claims the method of the present invention is defined as a determination of the constituent elements of and within an earth formation through the analysis of the secondary atomic radiation from the constituent elements derived through irradiation of the formation containing said elements adjacent to the sondes as illustrated with reaction causing primary atomic radiation. Primary atomic radiation as herein denoted is intended to include electromagnetic radiation and nuclear radiation and, without limitation, comprises alpha (α), beta (β), gamma (γ), bremsstrahlung radiation, X-rays and neutrons. The secondary atomic radiation derived from the irradiated formation constituent elements is intended to comprise, without limitation, alpha (α), beta (β), gamma (γ), bremsstrahlung and X-rays. While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. The method of locating compounds containing hydrocarbon constituents by detecting the presence and relative position of said constituents and certain immobile elements in an earth formation traversed by a well bore which comprises the steps of introducing an atomic radiation source into said well bore adjacent to the earth formation where said constituents and immobile elements are to be detected, irradiating said formation with said atomic radiation to generate secondary atomic radiation from said constituents and immobile elements, detecting said secondary atomic radiation derived from said constituents and immobile elements contiguous to the side wall of said well bore, detecting said secondary atomic radiation derived from said constituent and immobile elements within said earth formation spaced laterally from said well bore, comparing said detected secondary radiation to indicate an unbalance in said constituents and immobile elements contiguous to and spaced from said well bore, and indicating said unbalance as a representation of the location of hydrocarbons within said earth formation.

2. The method of detecting the presence and relative position of compounds containing hydrocarbon constituents in an earth formation traversed by a well bore which comprises the steps of introducing an atomic radiation source into said well bore adjacent to the earth formation where said constituents are to be detected, irradiating said formation with said atomic radiation to generate secondary atomic radiation from said constituents and certain immobile elements within said formation, positioning a detection means having a restricted admission orifice for said secondary atomic radiation adjacent to and a predetermined distance from said source, detecting the radiation derived from said constituents and immobile elements contiguous to the side wall of said well bore, detecting the radiation derived from said constituents and immobile elements in said earth formation spaced laterally from said well bore, comparing said detected radiation to indicate an unbalance in constituents contiguous to and spaced from said well bore, and indicating said difference as a representation of the location of hydrocarbons within said earth formation.

3. The method of distinguishing between carbon atoms in immobile form and in hydrocarbon form in an earth formation traversed by a well bore which comprises the steps of introducing an atomic radiation source into said well bore adjacent to the earth formation where said carbon atoms are to be detected, irradiating said formation with said atomic radiation to generate secondary atomic radiation from said carbon atoms, positioning radiation detection means having at least one restricted admission orifice for separating secondary radiations from said carbon atoms positioned contiguous to and a predetermined distance laterally from said well bore, detecting a first measure of secondary radiation identifiable as derived from carbon atoms contiguous to the side wall of said well bore, detecting a second measure of secondary radiation identifiable as derived from carbon atoms in said earth formation spaced laterally from said well bore, comparing said detected secondary radiation to indicate the existence of an unbalance in carbon atoms contiguous to and spaced from said well bore, and indicating said unbalance as a measure of the second detection with respect to the first detection whereby an increase of said second detection over said first detection is an indication of carbon in hydrocarbon form within said earth formation.

4. The method of detecting the presence of oil entrapped in an earth formation traversed by a well bore by distinguishing between organic carbon and inorganic carbon within said earth formation which comprises the steps of introducing an atomic radiation source into said well bore adjacent to the earth formation where said carbon atoms are to be detected, irradiating said formation with said atomic radiation to generate secondary atomic radiation from carbon and other atoms, positioning a radiation detection means having a restricted secondary radiation admission orifice adjacent to and a predetermined distance from said source, detecting the secondary radiation derived from carbon and other atoms contiguous to the side wall of said well bore, detecting the secondary radiation derived from carbon and other atoms in said earth formation spaced from said well bore, comparing said detected secondary radiation to indicate possible unbalances in secondary radiation from said other atoms contiguous to and spaced from said well bore, correlating said compared secondary radiations to indicate an unbalance in carbon atoms contiguous to and spaced from said well bore in the absence of an unbalance in detected secondary radiation from carbon atoms in carbonate form, and indicating said unbalance as a measure of the second detection with respect to the first detection whereby an increase of the second detection over the first detection is an indication of organic carbon in the form of entrapped oil.

5. The method of detecting the presence of oil entrapped in an earth formation traversed by a well bore by distinguishing between organic carbon and inorganic carbon within said formation comprising the steps of introducing an atomic radiation source into said well bore adjacent to the earth formation where said carbon atoms are to be detected, irradiating said formation with said atomic radiation to generate secondary atomic radiation from the constituent elements within said earth formation, positioning a secondary atomic radiation detection means having a restricted radiation admission orifice adjacent to and a predetermined distance from said source, detecting the secondary radiation derived from constituent elements contiguous to the side wall of said well bore, detecting the secondary radiation derived from constituent elements in said earth formation spaced from said well bore, comparing said detected secondary radiation to discern the existence of an unbalance in said two detections of secondary radiation from said carbon atoms coexistent with the detection of secondary radiation from calcium atoms, indicating the discerned unbalance as a measure of the second detection with respect to the first detection, whereby an unbalance of the carbon detection of the second detection over the first detection coupled with a stable calcium detection is an indication of the presence of carbon in organic form entrapped in a carbonate-containing formation.

6. The method of detecting permeability traps in subsurface earth formations wherein the earth formation is traversed by a well bore by detecting the presence of carbon atoms in carbonate form as a cementing agent for clastics comprising the steps of introducing an atomic radiation source into said well bore adjacent to the earth formation where said carbon atoms are to be detected, irradiating said formation with said atomic radiation to generate secondary atomic radiation from said carbon atoms, positioning a secondary radiation detection means having a restricted radiation admission orifice adjacent to and a predetermined distance from said source, detecting the secondary radiation derived from atomic particles contiguous to the side wall of said well bore, detecting the secondary radiation derived from atomic particles in said earth formation spaced from said well bore, comparing said detected secondary radiation to discern the existence of an unbalance in detected secondary radiation from carbon atoms coupled with a stable detection of secondary radiation from other formation elements contiguous to and spaced from said well bore, indicating said discerned unbalance as a measure of the first detection over the second detection, whereby an unbalance of the first detection of carbon over the second detection of carbon coupled with stable secondary radiation detection from other formation elements indicates the presence of carbonate cements in clastics of said formation.

7. The method of determining the presence of stratigraphic traps in subsurface lithified earth formations wherein the earth formation is traversed by a well bore by detecting the presence of carbon atoms in carbonate form in and around lithified sandy strata traversed by said well bore comprising the steps of introducing an atomic radiation source into said well bore adjacent to the earth formation where said carbon atoms are to be detected, irradiating said formation with said atomic radiation to generate secondary atomic radiation from carbon and calcium atoms within said formation, positioning a secondary radiation detection means having a restricted radiation admission orifice adjacent to and a predetermined distance from said source, detecting the secondary radiation derived from carbon and calcium atoms contiguous to the side wall of said well bore, detecting the secondary radiation derived from carbon and calcium atoms in said earth formation spaced from said well bore, comparing said detected secondary radiation to discern the existence of a balance in the detected secondary radiation from calcium atoms accompanied by a balance in the detected secondary radiation from carbon atoms, indicating the determination of the concurrent balances, repeating the foregoing steps in a second well bore spaced from said first well bore, comparing the indictated balances in the first and second irradiations correlated with depth within said well bores, and correlating the indicated balances from well to well as an indication of the stratification of said subsurface formations and the direction and orientation of deposited sandstone bodies or facies constituting said subsurface earth formations.

8. The method of determining the presence of hydrocarbons in subsurface lithified earth formations wherein the earth formation is traversed by a well bore by detecting changes in the mobile carbon content in predominantly calcium carbonate formations comprising the steps of introducing an atomic radiation source into well bore adjacent to the earth formation, irradiating said formation with said atomic radiation to generate secondary atomic radiation from carbon and calcium atoms within said formation, positioning a secondary radiation detection means adjacent to and a predetermined distance from said source, detecting the secondary radiation derived from said carbon and calcium atoms contiguous to the side wall of said well bore, detecting the secondary radiation derived from said carbon and calcium atoms in said earth formation spaced from said well bore, moving said source and detector axially along and upwardly through said well bore, indicating a continuous record of said detected secondary radiation from said calcium and carbon atoms, comparing said secondary radiation to discern the existence of an unbalance in the detected secondary radiation from carbon atoms contiguous to and spaced from said well bore in a first location within said well bore followed by a substantial similarity in detected secondary radiation from carbon and calcium atoms as an indication of the presence of hydrocarbons within said earth formation.

9. The method of determining the invasion into an earth formation penetrated by a well bore of materials introduced into said formation from said well bore and wherein said earth formation contains mobile constituent elements comprising the steps of suspending an atomic radiation source in said well bore, irradiating said earth formation with said atomic radiation to generate secondary atomic radiation from atomic particles of the constituent elements of said formation, positioning a secondary radiation detection means within said well bore and spaced from said source, shielding said detecting means against the detection of direct atomic radiation from said source, detecting the secondary radiation derived from the constituent elements contiguous to the side wall of said well bore, detecting the secondary radiation derived from constituent elements within said earth formation spaced from said well bore, comparing said detected secondary radiation to determine the existence of an unbalance between secondary radiation detection from certain constituent elements of said formation contiguous to said well bore and spaced from said well bore, and recording the existence of said unbalance as an indication of the penetration of said formation by said materials introduced into said well and the displacement of said mobile constituents by said material.

10. Apparatus for logging the geologic constituents of an earth formation penetrated by a well bore comprising a source of atomic radiation adapted to be positioned within said well bore for irradiating said well bore and earth formation with said atomic radiation to produce secondary atomic radiation from atomic particles forming said geologic constituents, means for collimating said irradiation to produce a substantially narrow path for said irradiation, means for decting said secondary radiation including at least a pair of collimated detectors for restricting the detected radiation in each to a particular depth of penetration of irradiation for said atomic irradiation into said earth formations, means for comparing said detected secondary radiations to determine dissimilarities between secondary radiation from said particular depths of penetration of irradiation, and means for indicating said dissimilarities between compared radiation to identify the mobility of constituent elements within said earth formation.

11. The apparatus of claim 10 wherein said source is a source of X rays.

12. The apparatus of claim 10 wherein said source is a source of $\gamma$ rays.

13. The apparatus of claim 10 wherein said source is a source of fast neutrons.

14. The apparatus of claim 10 wherein said secondary atomic radiation detector is adapted to detect backscattered X rays.

15. The apparatus of claim 10 wherein said secondary atomic radiation detector is adapted to detect backscattered $\gamma$ rays.

16. The apparatus of claim 10 wherein said secondary atomic radiation detector is adapted to detect bremsstrahlung derived from atomic absorption of $\beta$ rays from excited atomic nuclei.

17. The apparatus of claim 10 wherein said secondary atomic radiation detector is adapted to detect backscattered $\gamma$ rays and bremsstrahlung radiation from excited atomic nuclei.

18. The apparatus of claim 10 wherein said secondary atomic radiation detector is adapted to detect $\gamma$ rays produced by the inelastic scattering process.

19. The apparatus of claim 10 wherein said secondary atomic radiation detector is adapted to detect $\gamma$ rays derived from said constituents and immobile elements contiguous to the side wall of said well bore produced by the inelastic scattering process and wherein said secondary atomic radiation detector is adapted to detect bremsstrahlung derived from said constituents and said immobile elements spaced from said well bore produced by atomic absorption of $\beta$ rays from excited atomic nuclei.

20. The apparatus of claim 10 wherein said source is a source of pulsed fast neutrons.

21. The method of locating compounds containing hydrocarbon constituents by detecting the presence and relative position of constituents and immobile elements in an earth formation traversed by a well bore which comprises the steps of introducing an atomic radiation source into said well bore adjacent to the earth formation where said constituents are to be detected, modulating at least a portion of the radiation from said source, irradiating said formation with said modulated and unmodulated atomic radiation to generate modulated and unmodulated secondary atomic radiation from certain of said constituents and immobile elements within said formation, detecting said secondary atomic radiation derived from said constituents and immobile elements contiguous to the side wall of said well bore, detecting said secondary atomic radiation derived from said constituent and immoble elements within said earth formation spaced from said well bore, separating the secondary radiation derived from the modulated and unmodulated sources, comparing said detected secondary radiation to discern a difference in said separated detected radiation from the same source to indicate an unbalance in said constituents contiguous to and spaced from said well bore, comparing said modulated and unmodulated detected secondary radiations from the same position within said earth formation to determine the source producing said radiations, and indicating said differences and source determinations as a representation of the location of hydrocarbons with respect to said well bore.

References Cited in the file of this patent

UNITED STATES PATENTS

| | | |
|---|---|---|
| 2,133,776 | Bender | Oct. 18, 1938 |
| 2,275,748 | Fearon | Mar. 10, 1942 |
| 2,727,155 | Herzog et al. | Dec. 13, 1955 |
| 2,769,096 | Frey | Oct. 30, 1956 |
| 2,769,918 | Tittle | Nov. 6, 1956 |
| 2,802,951 | Seevers | Aug. 13, 1957 |
| 2,884,534 | Fearon et al. | Apr. 28, 1959 |
| 2,934,652 | Caldwell | Apr. 26, 1960 |